United States Patent
Waters et al.

(10) Patent No.: US 11,422,598 B2
(45) Date of Patent: Aug. 23, 2022

(54) HOST CONTROLLER INTERFACE FOR UNIVERSAL SERIAL BUS (USB) POWER DELIVERY

(71) Applicant: TEXAS INSTRUMENTS INCORPORATED, Dallas, TX (US)

(72) Inventors: Deric Waters, Dallas, TX (US); Bill Waters, Portland, OR (US)

(73) Assignee: Texas Instruments Incorporated, Dallas, TX (US)

( * ) Notice: Subject to any disclaimer, the term of this patent is extended or adjusted under 35 U.S.C. 154(b) by 618 days.

(21) Appl. No.: 15/369,129

(22) Filed: Dec. 5, 2016

(65) Prior Publication Data

US 2017/0147052 A1 May 25, 2017

Related U.S. Application Data

(63) Continuation of application No. 14/160,256, filed on Jan. 21, 2014, now abandoned.

(60) Provisional application No. 61/754,846, filed on Jan. 21, 2013.

(51) Int. Cl.
*G06F 1/26* (2006.01)
*G06F 13/38* (2006.01)
*G06F 1/3296* (2019.01)
*G06F 13/42* (2006.01)

(52) U.S. Cl.
CPC ............ *G06F 1/266* (2013.01); *G06F 1/3296* (2013.01); *G06F 13/385* (2013.01); *G06F 13/4282* (2013.01); *Y02D 10/00* (2018.01)

(58) Field of Classification Search
CPC ..................................................... G06F 17/30
See application file for complete search history.

(56) References Cited

U.S. PATENT DOCUMENTS 4,779,195 A * 10/1988 James ................ G06F 13/24
710/49
5,675,813 A * 10/1997 Holmdahl ........... G06F 1/3215
710/8

(Continued)

OTHER PUBLICATIONS

Bob Dunstan, Universal Serial Bus Power Delivery Specification Revision 1.0, Jul. 5, 2012 (Year: 2012).*

*Primary Examiner* — Chad G Erdman
(74) *Attorney, Agent, or Firm* — Mark A. Valetti; Charles A. Brill; Frank D. Cimino

(57) ABSTRACT

An apparatus, comprising a system management bus configured to communicate with a USB PDC, and a processor coupled to the system management bus and configured to send a power delivery configuration to the PDC, wherein the power delivery configuration comprises voltage and current settings, and receive a power delivery status from the PDC. Also disclosed is an apparatus comprising a power bus interface configured to communicate with a USB port partner, a system management bus interface configured to communicate with a host, and a processor coupled to the power bus interface and the system management bus interface, wherein the processor is configured to receive, via the system management bus interface, a power delivery configuration from the host, generate a power capability message based on the power delivery configuration, and send, via the power bus interface, the power capability message to the USB port partner.

15 Claims, 4 Drawing Sheets

(56) References Cited

U.S. PATENT DOCUMENTS

| | | | |
|---|---|---|---|
| 6,205,501 B1* | 3/2001 | Brief | G06F 13/385 710/100 |
| 6,389,029 B1* | 5/2002 | McAlear | H04L 12/46 370/402 |
| 6,636,923 B1* | 10/2003 | Meirsman | G06F 13/4022 370/420 |
| 7,305,675 B1* | 12/2007 | Gulick | G06F 9/4812 710/19 |
| 7,404,027 B2* | 7/2008 | Baba | G06F 13/4286 710/305 |
| 7,447,922 B1 | 11/2008 | Asbury et al. | |
| 8,990,470 B1* | 3/2015 | Sala | H04L 29/06 710/105 |
| 2003/0054703 A1* | 3/2003 | Fischer | H02J 7/0042 439/894 |
| 2004/0205279 A1* | 10/2004 | Ohnishi | G06F 13/385 710/305 |
| 2006/0020736 A1* | 1/2006 | Jackson | G06F 13/385 710/313 |
| 2007/0150758 A1* | 6/2007 | Henderson | G06F 11/0766 713/300 |
| 2007/0180269 A1* | 8/2007 | Irish | G06F 12/1475 713/193 |
| 2008/0059641 A1* | 3/2008 | Hernandez | G06F 9/5027 709/229 |
| 2009/0055157 A1* | 2/2009 | Soffer | G06F 15/7864 703/27 |
| 2009/0164670 A1* | 6/2009 | Nakano | G06K 15/00 710/18 |
| 2009/0222685 A1* | 9/2009 | Foster | G06F 1/12 713/500 |
| 2010/0180051 A1* | 7/2010 | Harris | G06F 9/4413 710/14 |
| 2010/0205463 A1* | 8/2010 | Magnusson | G06F 1/266 713/300 |
| 2010/0218012 A1* | 8/2010 | Joseph | G06F 1/3203 713/310 |
| 2012/0069029 A1* | 3/2012 | Bourd | G06F 9/546 345/502 |
| 2012/0078690 A1* | 3/2012 | Harriman | G06F 1/266 705/14.4 |
| 2013/0076133 A1 | 3/2013 | Gammel et al. | |
| 2013/0111231 A1* | 5/2013 | Chen | G06F 1/26 713/300 |
| 2013/0151731 A1* | 6/2013 | Lai | G06F 13/4068 710/3 |
| 2013/0207454 A1* | 8/2013 | Stellick | H04L 12/10 307/1 |
| 2014/0085367 A1* | 3/2014 | Mori | G06K 15/102 347/12 |
| 2014/0183974 A1 | 7/2014 | Proefrock et al. | |

* cited by examiner

HOST CONTROLLER INTERFACE FOR UNIVERSAL SERIAL BUS (USB) POWER DELIVERY

CROSS-REFERENCE TO RELATED APPLICATION

The present application is a continuation of U.S. patent application Ser. No. 14/160,256, filed Jan. 21, 2014, which claims priority to U.S. Provisional Patent Application 61/754,846, filed on Jan. 21, 2013 by Deric Waters, et. al., and entitled "Host controller Interface For USB Power Delivery", which are incorporated herein by reference as if reproduced in its entirety.

BACKGROUND

Universal Serial Bus (USB) may have evolved from a data interface capable of supplying limited power to a primary provider of power with a data interface. Today some devices may be charged and/or powered via USB ports contained in laptops, cars, aircraft and/or wall sockets. The USB Power Delivery (PD) specification version 1.0, which is incorporated herein by reference as if reproduced in its entirety, is defined to enable more flexible power delivery and provide higher power over USB PD cables and connectors. For example, the USB PD specification may increase power levels up to about 100 Watts (W), allow a power consumer and/or a power provider to swap roles, optimize power management across multiple peripherals, and/or manage power at a system level. The USB PD specification defines a communication link and protocol between USB ports connected via a USB PD cable and connectors, where a pair of USB PD port partners (e.g. a provider port and a consumer port) may exchange power delivery capabilities and negotiate power requirements over the communication link.

SUMMARY

A host interface for USB PD is disclosed herein. In one embodiment, an apparatus includes a system management bus and a processor. The system management bus is configured to communicate with a USB Power Delivery Controller (PDC). The processor is coupled to the system management bus and configured to communicate with the PDC via the system management bus. The processor is further configured to send a power delivery configuration to the PDC, wherein the power delivery configuration comprises voltage and current settings, send a power delivery command to the PDC, wherein the power delivery command instructs the PDC to request a power capability of a USB port partner, and receive a power delivery status from the PDC, wherein the power delivery status comprises the power capability of the USB port partner.

In another embodiment, an apparatus includes a power bus interface, a system management bus interface, and a processor. The power bus is configured to communicate with a USB port partner. The system management bus interface is configured to communicate with a host. The processor is coupled to the power bus interface and the system management interface. The processor is further configured to receive, via the system management bus interface, a power delivery configuration from the host, wherein the power delivery configuration comprises voltage and current settings, generate a power capability message based on the power delivery configuration, send, via the power bus interface, the power capability message to the USB port partner, and send, via the system management bus interface, a power delivery status to the host, wherein the power delivery status comprises a USB plug detection status.

In yet another embodiment, a method for interfacing with a PDC via a system management bus includes sending a power delivery configuration, a power delivery command, and a power delivery event configuration to the PDC. The method further includes receiving a power delivery status, and a power delivery message from the PDC. The power delivery configuration comprises voltage and current settings. The power delivery command instructs the PDC to send a first power delivery message to a USB port partner of the PDC, and wherein the first power delivery message comprises a hard reset request. The power delivery event configuration comprises a hard reset event. The power delivery status comprises a hard reset status indicating an occurrence of the hard reset event at the PDC. The received power delivery message comprises a power capability of the USB port partner.

BRIEF DESCRIPTION OF THE DRAWINGS

For a detailed description of exemplary embodiments of the invention, reference will now be made to the accompanying drawings in which.

DETAILED DESCRIPTION

Figure 1:
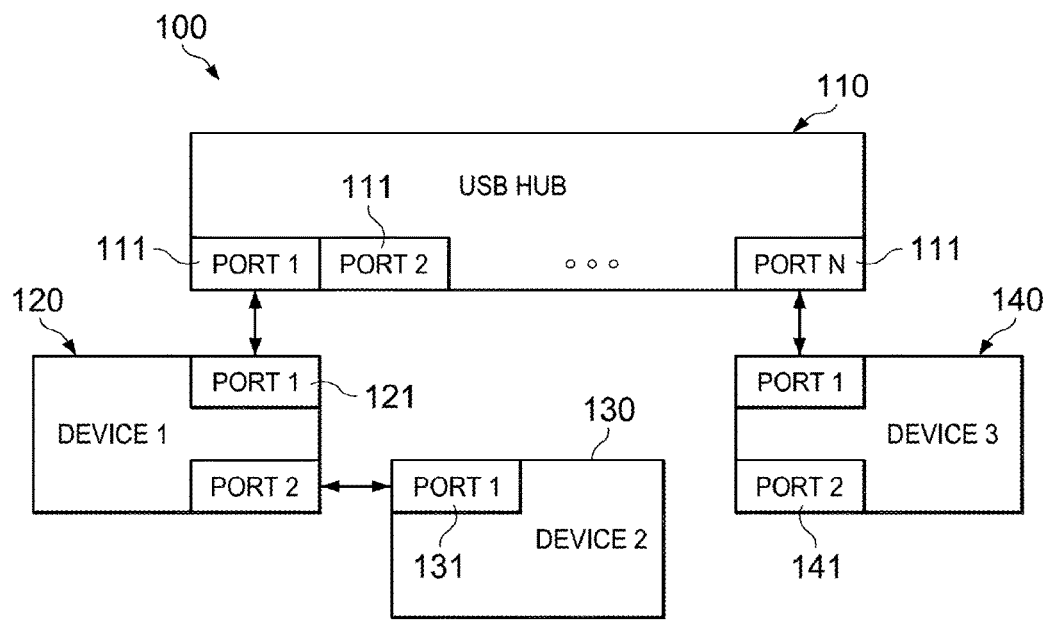
FIG. 1 shows a block diagram of a USB connection system in accordance with various embodiments.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The USB PD specification may define a communication protocol to address the emergence of employing USB ports primarily for power delivery along with some data transfer instead of primarily for data transfer along with some power delivery. The USB PD specification may define a communication link between ports connected via USB PD cables and connectors. The communication may be designed to be half-duplex and packet based. The packets may comprise information that enables a pair of connected ports (e.g. a sink port and a source port) to communicate and negotiate voltage and/or current that the source port may provide to the sink port. The underlying communication defined in the USB PD specification may be a binary Frequency Shift Keying (FSK). The power delivery communication may occur independently from USB data communication over a USB cable comprising a power delivery wire, $V_{BUS}$ and a data wire, where the USB PD communication may be over the power delivery wire and the USB data communication may be over a data wire. The USB PD specification may enable a device to negotiate power of varying amount based on requirement instead of supplying a default amount of power to all devices. For example, a low power headphone may be plugged into a laptop via a USB PD port and may negotiate for less power (e.g. about 2 W) than a default power. In contrast, a monitor may be plugged into the laptop and negotiate for a high power of about 100 W. In addition, power delivery may respond to system power requirement changes and/or requests from a far-end device by increasing or decreasing power consumption accordingly.

A USB PD port may act as a power provider to deliver power or a consumer to sink power. The USB PD specification may define a procedure for a port to switch role. For example, a USB PD port may act as a Provider/Consumer (P/C), where the P/C may be a provider that may switch role to be a consumer. Conversely, a USB PD port may act as a Consumer/Provider (C/P), where the C/P may be a consumer that may switch role to be a provider. It should be noted that in the present disclosure, a USB PD port may be referred to as a USB port or a port, and a USB PD port partner (e.g. connecting to a local USB device) may be referred to as a far-end device, a far-end port, or a port partner.

Embodiments of the host interface for USB PD disclosed herein includes a set of commands for exchanging USB PD information between a host controller (e.g. an embedded controller) and a USB PDC. The PDC may implement functionalities defined in the USB PD specification and may be realized in an Integrated Circuit (IC). The host controller may manage and control the PDC for power delivery. The commands may be communicated over a bus interface comprising a data line and a clock line. In some embodiments, the bus interface may employ an Inter-Integrated Circuit (I2C) bus interface, a System Management Bus (SMBus) interface as defined in the SMBus Specification version 2.0, which is incorporated herein by reference as if reproduced in its entirety, or any other bus interface configured to communicate across Integrated Circuit (ICs). In such embodiment, the PDC may be a slave module to the host controller, where the host controller may issue commands to the PDC. For example, a host controller may issue a write command or a read command to a PDC. A write command may cause the PDC to initialize some parameters or perform a task and a read command may cause the PDC to return a status or a received message. In some embodiments, the bus interface may include an additional alert line, which may allow the PDC to notify the host controller when some events occur. The host controller may enable or disable an event alert by configuring the PDC. In some embodiments, a PDC may comprise a non-volatile memory (e.g. Electrical Erasable Programmable Read-Only Memory (EE-PROM)) and a host controller may request the PDC to store parameters into the non-volatile memory.

FIG. 1 shows a block diagram of a USB connection system 100 in accordance with various embodiments. System 100 may comprise a USB hub 110 and a plurality of devices 120, 130, and 140. USB hub 110 may be any device configured to expand a single USB port (e.g. connecting to a host system) into multiple USB ports available for device connections. USB hub 110 may comprise a plurality of USB ports 111 (e.g. Port #1 to Port #N). Devices 120, 130, and 140 may be any device configured to communicate to a host system via the USB PD communication protocol (e.g. power delivery) and/or the USB communication protocol (e.g. data transfer). For example, a power adaptor may implement the USB PD communication protocol but not the USB communication protocol, whereas a smartphone or a tablet may implement both the USB PD and USB communication protocols. Each device 120, 130, or 140 may comprise at least one USB port 121, 131, or 141, respectively, for USB communication. For example, devices 120 and 140 may be connected to a host system via USB hub 110, where a port 121 of devices 120 may be connected to a port 111 of USB hub 110 and a port 141 of devices 140 may be connected to another port 111 of USB hub 110. USB devices may be chained, for example, device 130 may be connected to USB hub 110 via device 120.

In some embodiments, USB port 111, 121, 131, and/or 141 may be USB PD ports and may be a provider that sources power or a consumer that sinks power. In some other embodiments, a USB port 111, 121, 131, and/or 141 may be a P/C port or a C/P port. A P/C port may be a provider that sources power and later switches to a consumer that sinks power, whereas a C/P port may be a consumer that sinks power and later switches to a provider that sources power. A provider may derive power sources from a plurality of power sources, such as an external power source (e.g. Alternating Current (AC) power), a power storage (e.g. a battery), and/or other ports (e.g. a bus-powered hub). A consumer may utilize power to operate internal functions, power an attached device, and/or store power to some power storages (e.g. battery).

Figure 2:
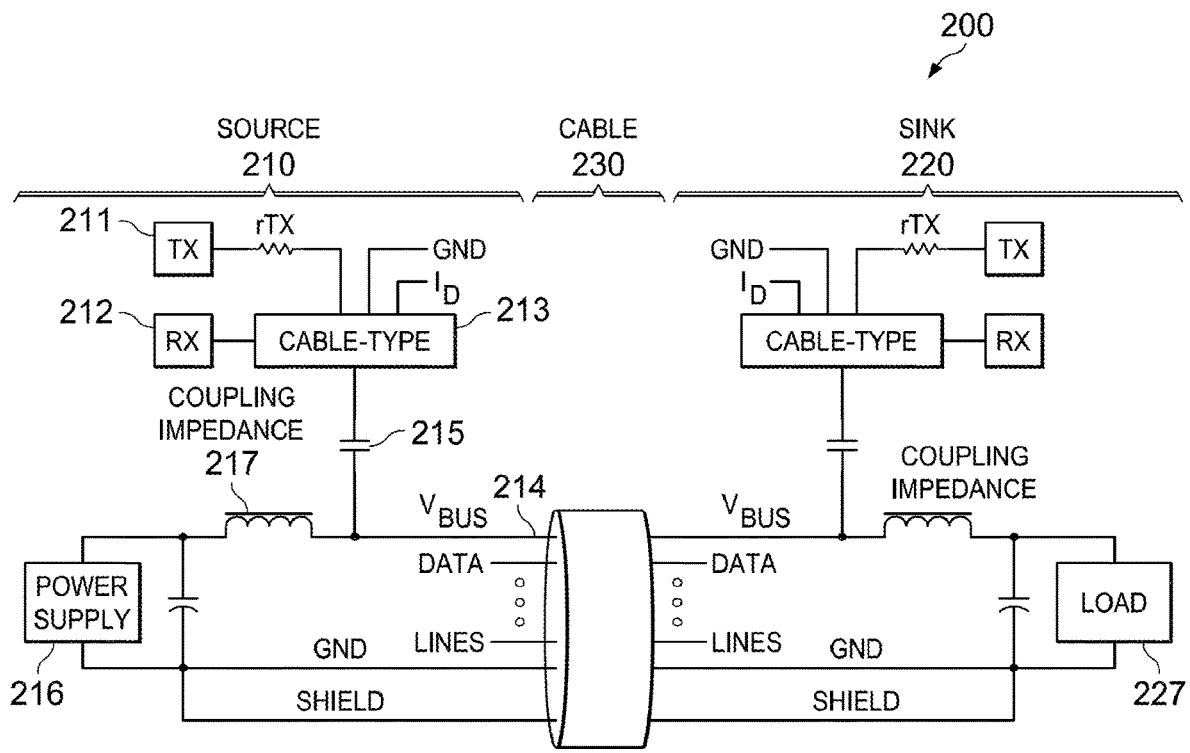
FIG. 2 shows a block diagram of a USB PD system in accordance with various embodiments.

FIG. 2 shows a block diagram of a USB PD interconnection system 200 in accordance with various embodiments. System 200 may comprise a source 210 interconnected to a sink 220 via a cable 230. Source 210 may comprise a transmitter (Tx) 211, a receiver (Rx) 212, a cable detection module 213, a power delivery wire $V_{BUS}$ 214, and a coupling capacitor 215. The transmitter 211 and the receiver 212 may be AC coupled to the power delivery wire $V_{BUS}$ 214 via the coupling capacitor 215. The transmitter 211 and receiver 212 may be configured to transmit and receive signal, respectively, over the power delivery wire $V_{BUS}$ 214. The cable detection module 213 may be coupled to the transmitter 211 and the receiver 212 and configured to detect the type of an attached cable. Source 210 may further comprise a power supply source 216 and a coupling impedance 217, which separates the power supply source 216 from the power delivery wire $V_{BUS}$ 214, the transmitter 211, and the receiver 212. Similarly, the sink 220 may be coupled and configured in substantially similar mechanisms as source 210. However, the sink 220 may comprise a load 227 instead of a power supply 216 as in source 210.

Figure 3:
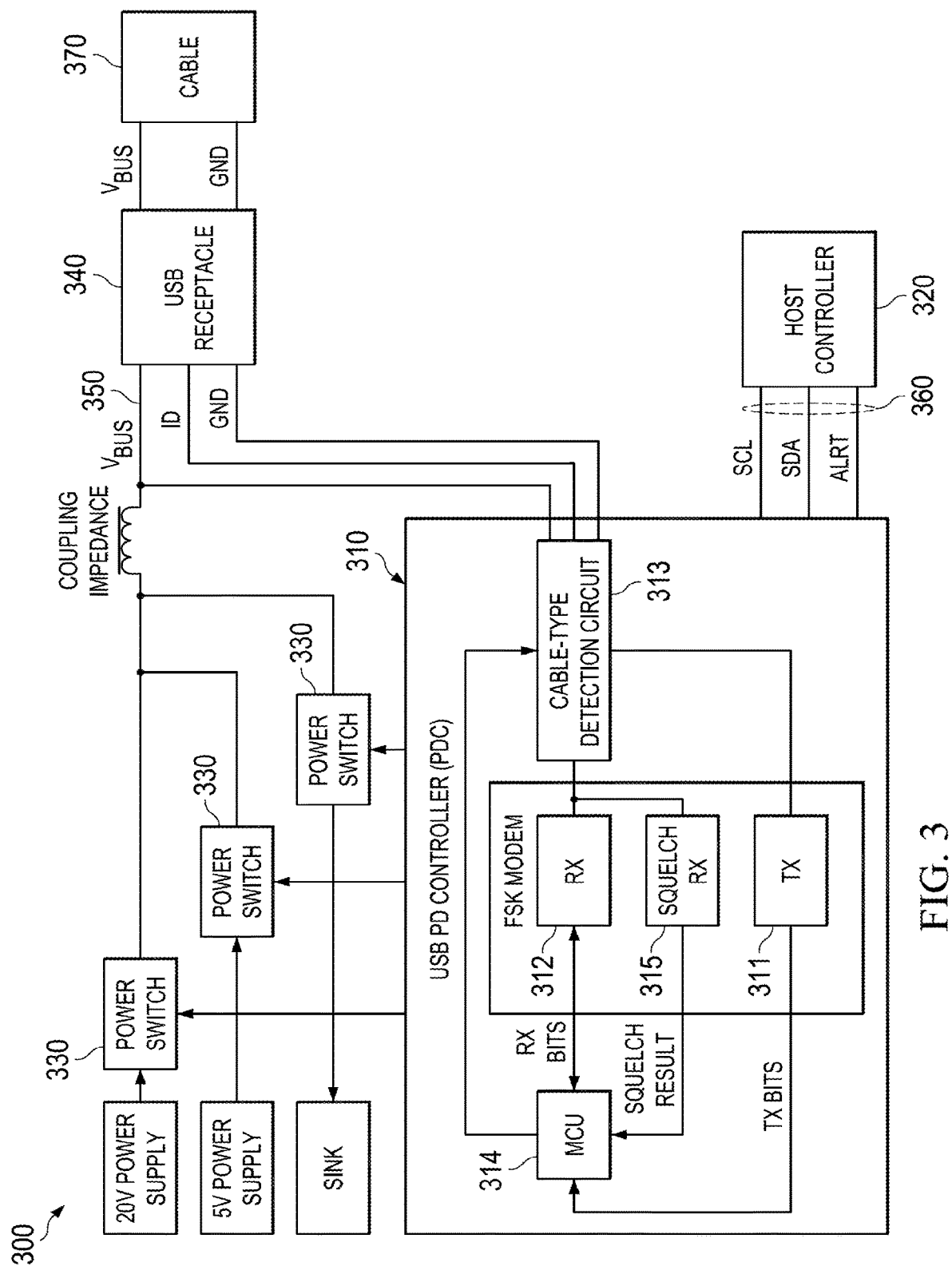
FIG. 3 shows a block diagram of a USB PD controller system in accordance with various embodiments.

FIG. 3 shows a block diagram of a USB PD system 300 in accordance with various embodiments. USB PD system 300 may be a provider that sources power or a consumer that sinks power. USB PD system 300 may comprise substantially similar components as in source 210 or sink 220. However, USB PD system 300 may be intended to illustrate a source 210 or a sink 220 implemented via a PDC 310 and a host controller 320. In USB PD system 300, PDC 310 may be connected to a plurality of power switches 330 and a USB receptacle 340 inserted with a cable 370.

PDC 310 may be any device and/or IC configured to implement the communication protocol defined in the USB PD specification. PDC 310 may comprise a transmitter (Tx) 311, a receiver (Rx) 312, and a cable-type detection module 313, which may be substantially similar to transmitter 211, receiver 212, and cable detection module 213. PDC 310 may further comprise a microcontroller (MCU) 314, which may implement a power delivery communication stack as defined in the USB PD specification for power delivery message negotiations. The transmitter 311 and the receiver 312 may be configured to implement a half-duplex frequency shift keying (FSK) modem for the transmission or reception of the power delivery negotiation messages over a power delivery wire $V_{BUS}$ 350 (e.g. power delivery wire $V_{BUS}$ 214) that connects PDC 310 to a far-end port (e.g. source 210 or sink 220) via USB receptacle 340 and cable 370. PDC 310 may further comprise a receive squelch detector 315, which may be configured to detect signal level on the power delivery wire $V_{BUS}$ 350 and may determine the presence of data communication on the power delivery wire $V_{BUS}$ 350 based on the detected signal level. PDC 310 may switch the power switches 330 in or out depending on power delivery negotiations and/or configurations. For example, PDC 310 may switch to a 20 Volt (V) power supply at one time and may switch to a 5V power supply at another time upon a request. In addition, PDC 310 may switch to sink power instead of source power (e.g. to charge a battery) upon a role swap request. In some embodiments, PDC 310 may further comprise a non-volatile memory, which may store configurations parameters.

Host controller 320 may be any device configured to control PDC 310. For example, host controller 320 may be an embedded controller, a MCU, or any other processors. Host controller 320 may be coupled to PDC 310 via a bus interface 360. In an embodiment, bus interface 360 may be a SMBus interface comprising a clock line and a data line as defined in the SMBus specification. In such embodiment, host controller 320 may be a master and PDC 310 may be a slave, where the host controller 320 may issue a write command or a read command to PDC 310. During a write command, the host controller 320 may place a slave address, a command code, a write transaction type, and a data with variable lengths on the data line. During a read command, host controller 320 may place a slave address, a command code, a read transaction type, and a data with variable lengths on the data line. The read transaction may cause the host controller 320 and the PDC 310 to switch transmit and receive direction, thus allowing PDC 310 to place data on the data line. The bus interface 360 may further comprise an alert signal to enable PDC 310 to notify host controller 320 when some events occur. Host controller 320 may be configured to implement a set of host commands to configure PDC 310, manage PDC 310 power delivery, and retrieve statuses from PDC 310. Host controller 320 may perform some additional actions based on statuses read from PDC 310.

Figure 4:
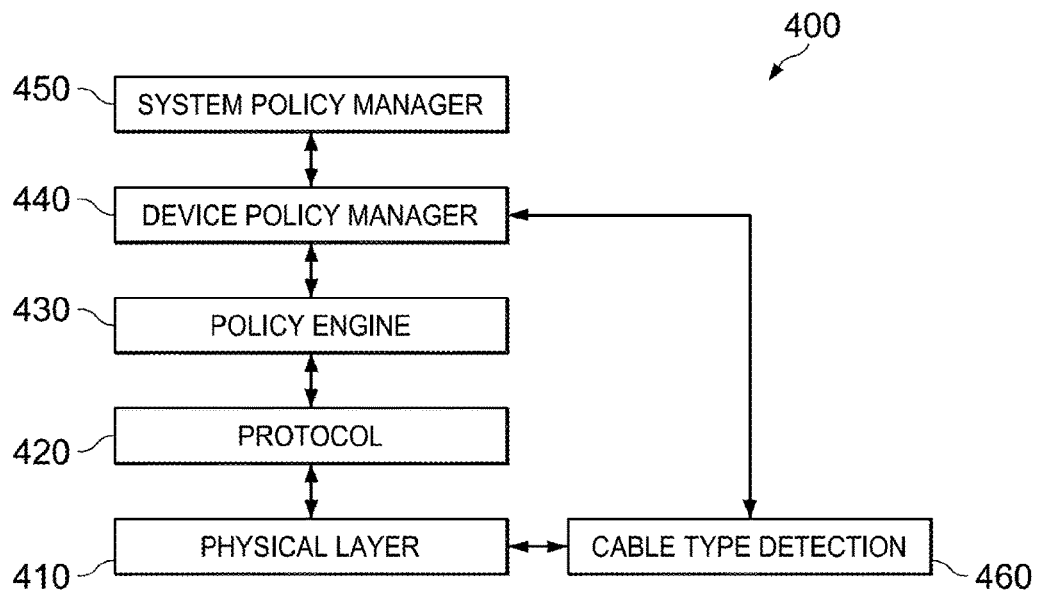
FIG. 4 shows a block diagram of logical layers in a USB PD system in accordance with various embodiments.

FIG. 4 shows a block diagram of logical layers in a USB PD system 400 in accordance with various embodiments. System 400 may comprise a physical layer 410, a protocol 420, a policy engine 430, a device policy manager 440, a system policy manager 450, and a cable-type detection 460 as defined in the USB PD specification. Physical layer 410 may be configured to handle transmission and reception of power delivery messages on a power delivery wire (e.g. power delivery wire $V_{BUS}$ 350). Protocol 420 may be configured to exchange power delivery messages between USB PD devices (e.g. between source 210 and sink 220). Policy engine 430 may be configured to implement a local policy for power delivery at a USB PD device. Device policy manager 440 may be configured to manage USB PD resources within a USB PD device and may span across one or more USB ports (e.g. ports 111, 121, 131, or 141). System policy manger 450 may be configured to manage system wide power delivery in a USB PD interconnection system (e.g. USB PD interconnection system 200) across multiple providers and/or consumers. Cable-type detection 460 may be configured to detect the type of attached cables via physical layer 410. Cable-type detection 460 may provide the detected cable information to device policy manager 440. The device policy manager 440 may then further manage resources according to the cable information. It should be noted that system policy manager 450 may be optional in a USB PD system.

In some embodiments, a PDC (e.g. 310) may implement physical layer 410, protocol layer 420, and policy engine 430, but may not fully implement device policy manager 440. In such embodiments, a device policy manager 440 may be fully or partially implemented on a host controller (e.g. host controller 320) external to the PDC. As such, the host controller may communicate with the PDC to jointly realize complete USB PD functionalities. For example, a host controller may configure a PDC, request the PDC to issue power delivery messages to a connected far-end device, read PDC statuses, read far-end messages received by the PDC, and/or perform other actions locally in response to messages received from the far-end device. The USB PD specification defines two types of protocol messages, control messages and data messages. Control messages may be messages for managing message flow between a pair of USB PD ports (e.g. GoodCRC, Accept, Reject messages, etc.) or for exchanging commands (e.g. GotoMin, Get_Sink_Cap, Get_Source_Cap, Swap messages, etc.) between a pair of USB PD ports. Data messages may be messages for carrying data information for power delivery negotiation (e.g. SourceCapabilities, SinkCapabilities, Request messages, Built in Self-Test (GIST), vendor defined, etc.). For example, a SourceCapabilities or SinkCapabilities message may comprise a plurality of power data objects (PDOs) and a Request message may comprise a plurality of request data objects (RDOs). A PDO may comprise current, voltage, and/or power limits (e.g. maximum, minimum, peak, and/or or operating) for a single power supply (e.g. fixed, variable, or battery). A provider port may send a PDO to indicate current, voltage, and/or power that the provider port may provide. A consumer port may send a PDO to indicate current, voltage, and/or power that the consumer port may operate on. In addition, a consumer port may send a RDO in response to a PDO sent by the provider port to negotiate current, voltage, and/or power that the consumer port may require. A PDC may fully manage and control the flow control messages as the flow control messages may be exchanged entirely between the PDC and a connected far-end device, whereas the command control messages and the data messages may be partially driven by a host controller. FIGS. 5-8 are intended to illustrate some examples of interactions between a host controller and a PDC when implementing some of the USB PD functionalities. The interactions may be described with the host controller acting as a master to the PDC (e.g. over a SMBus interface), where all commands (e.g. read or write transactions) may be initiated by the host controller and the PDC may notify the host controller via an alert signal. It should be noted that the mechanisms for a PDC to alert the host may be alternatively configured as determined by a person of ordinary skill in the art to achieve the same functionalities.

Figure 5:
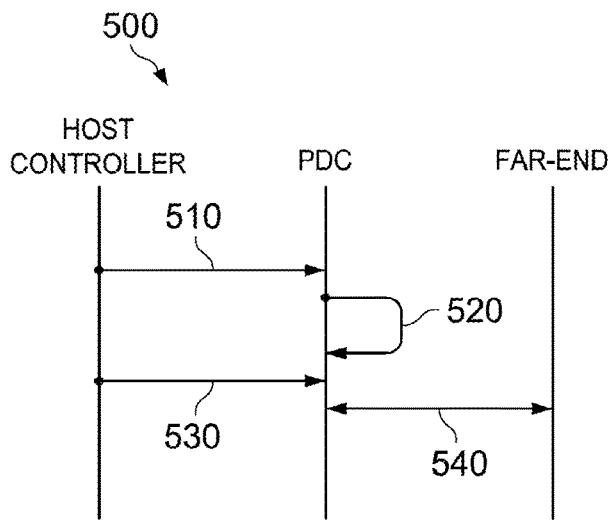
FIG. 5 shows a protocol diagram of an initialization method between a host controller, a PDC, and a far-end device in accordance with various embodiments.

FIG. 5 shows a protocol diagram of an initialization method 500 between a host controller (e.g. host controller 320), a PDC (e.g. PDC 310), and a far-end device in accordance with various embodiments. In method 500, the host controller and the PDC may reside on a local device, which may act as a source or a sink depending on configuration parameters. Method 500 may begin with the host controller sending a set of initialization parameters and negotiation parameters to configure the PDC at step 510. Initialization parameters may include PDOs for a source, PDOs for a sink, and/or RDOs for a sink. The source PDOs may be employed by a source when sending a source capability message while the sink PDOs and the RDOs may be employed by a sink when sending a sink capability message and requesting for power, respectively. At step 520, the PDC may save the parameters locally. At step 530, the host controller may send an enable command to the PDC to enable the PDC to begin operating with the initialization and negotiation parameters. At step 540, the PDC may establish a PD connection, exchange capabilities with the far-end device and/or request power from the far-end device according to the protocol defined in the USB PD specification.

Figure 6:
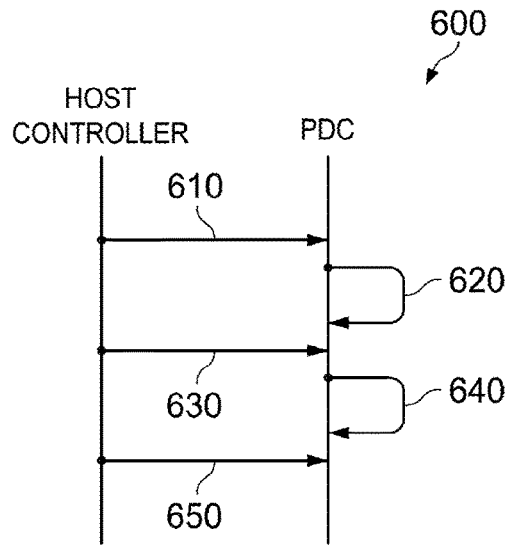
FIG. 6 shows a protocol diagram of a re-initialization method between a host controller and a PDC in accordance with various embodiments.

FIG. 6 shows a protocol diagram of a re-initialization method 600 between a host controller (e.g. host controller 320) and a PDC (e.g. PDC 310) in accordance with various embodiments. Method 600 may begin after the PDC is initialized (e.g. after step 530 of method 500 is completed). At step 610, the host controller may send a re-initialization command to the PDC to start a re-initialization process. At step 620, the PDC may prepare to enter a re-initialization state. For example, the PDC may abort an active PD contract. At step 630, the host controller may send updated initialization parameters to the PDC. At step 640, the PDC may save the parameters locally. At step 650, the host controller may send an enable command to the PDC to activate the updated initialization parameters. Upon receiving the enable command, the PDC may operate according to updated initialization parameters.

Figure 7:
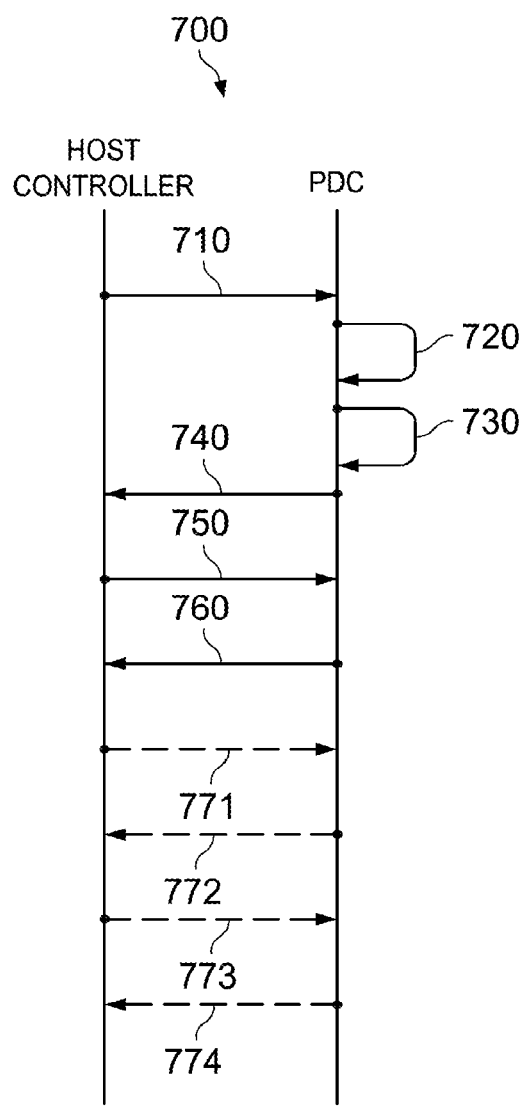
FIG. 7 shows a protocol diagram of an event alert method between a host controller and a PDC in accordance with various embodiments.

FIG. 7 shows a protocol diagram of an event alert method 700 between a host controller (e.g. host controller 320) and a PDC (e.g. PDC 310) in accordance with various embodiments. Method 700 may begin with the host controller sending an alert status mask command to the PDC to register with the PDC for some events at step 710. Some examples of events may include a hardware reset event, a plug status event, an error event, a message received event, and/or a BIST mode event. At step 720, the PDC may save the registered events locally. At step 730, the PDC may detect an event that has been registered by the host controller. At step 740, the PDC may assert an alert signal (e.g. an additional signal separated from data transaction) to notify the host controller of an event. At step 750, the host controller may issue a read command to the PDC to retrieve the reason of alert. At step 760, the PDC may return the reason of alert to the host controller. The host controller may take various actions depending on the received event. In one embodiment, the host controller may perform some actions based on the retrieved event. In another embodiment, the host controller may further retrieve event detail (e.g. type of hard reset, type of cable detected, or type of error detected) by issuing a command to the PDC as shown in step 771 and the PDC may return the event detail to the host controller at step 772. In yet another embodiment, the event detail may trigger the host controller to retrieve further information from the PDC, such as retrieving a message from the PDC, by issuing a read message command to the PDC as shown in step 773, and the PDC may return the received message to the host controller at step 774. The host controller may or may not take further actions depending on the event detail or the message read. As such, steps 771-774 may be optional and may depend on the received event.

Figure 8:
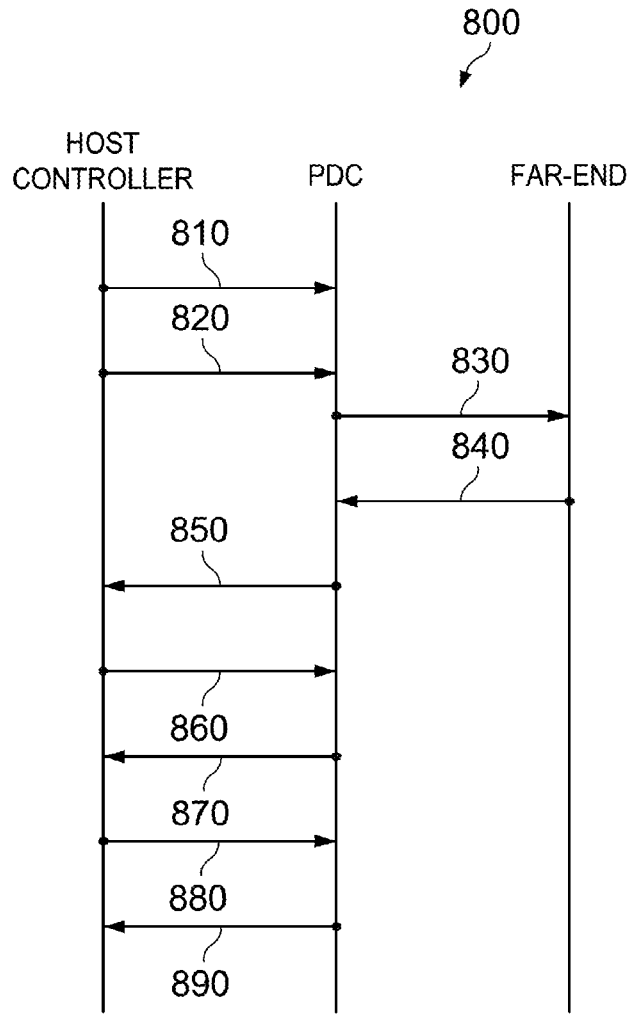
FIG. 8 shows a protocol diagram of a PDC control method between a host controller, a PDC, and a far-end device in accordance with various embodiments.

FIG. 8 shows a protocol diagram of a control method 800 between a host controller (e.g. host controller 320), a PDC (e.g. PDC 310), and a far-end device in accordance with various embodiments. In method 800, the host controller and the PDC may reside on a local device. Method 800 may begin with the host controller sending a command to the PDC to request capability of a connected port partner at step 810. At step 820, the host controller may send an alert status mask command to the PDC to register with the PDC for a received message event. At step 830, the PDC may send the capability request message (e.g. Get_Source_Cap) to the far-end device. At step 840, the PDC may receive a capability response from the far-end device. At step 850, the PDC may assert an alert signal to notify the host controller of a received message. At step 860, the host controller may issue a read command to the PDC to retrieve the reason of alert. At step 870, the PDC may return the reason of alert (e.g. a capability message is received) to the host controller. At step 880, the host controller may issue a command to retrieve the received capability message. At step 890, the PDC may send the received message to the host controller.

Table 1 shows an embodiment of host interface commands that may be employed by a host controller (e.g. host controller 320) to communicate with a PDC (e.g. PDC 310) in a USB PD system (e.g. USB PD system 300) to perform USB power delivery functionalities. The host controller and the PDC may reside on a local device and may negotiate power delivery options with a connected far-end device. The PDC may implement the USB PD communication protocol (e.g. physical layer and protocol layer) as defined in the USB PD specification and the host controller may configure and manage the PDC. Some examples of host interface commands may include sending PDC configurations (e.g. initialization parameters and negotiation parameters) and PDC controls (e.g. local actions and far-end actions), and retrieving PDC statuses (e.g. events and received messages). In Table 1, a read command from the host controller may be indicated as (R) and a write command from the host controller may be indicated as (W). It should be noted that the code values, command names, data values, and/or bit positions described in the following embodiments may be for illustrative purpose. In addition, the interactions may be described with the host controller acting as a master to the PDC (e.g. over a SMBus interface) and initiating read and/or write commands. However, the interface commands may be alternatively configured as determined by a person of ordinary skill in the art to achieve the same functionalities.

TABLE 1

List of Host Controller Interface Commands

| Code | Command | R/W | Description |
|------|---------|-----|-------------|
| 00h | STATUS_ALERT | R | Reasons of alert. |
| 01h | CLEAR_STATUS | W | Clears all bits in STATUS_ALERT |
| 02h | STATUS_USB_PD | R | Alert events |
| 03h | STATUS_SMBUS_SLAVE | R | SMBus status |
| 05h | ENABLE | W | Enables PDC |
| 06h | REINITIALIZE | W | Sets PDC in re-initialization mode |

TABLE 1-continued

List of Host Controller Interface Commands

| Code | Command | R/W | Description |
|---|---|---|---|
| 07h | VOLTAGE_INFO | R | Voltage levels of USB PD system |
| 08h | ACTIVE_CONTRACT_PDO | R | PDO of a current contract |
| 09h | ACTIVE_CONTRACT_RDO | R | RDO of a current contract |
| 0Ah | USB_PD_CONTROL | W | Commands PDC to perform an action |
| 0Bh | VENDOR_SPECIFIC | R/W | Vendor specific info |
| 0Ch | STORE_CONFIGURATION | W | Requests PDC to store configuration to a non-volatile memory |
| 0Dh | RESET | W | Resets PDC |
| 0Eh | DEVICE_ID | R | PDC hardware and firmware version |
| 0Fh | SPECIFICATION_REVISION | R | Supported USB specification revision |
| 10h | SOURCE_PDO_BATTERY | R/W | Initialization parameters for battery power supply |
| 11h | CAPABILITIES | R | PDOs returned by a partner device |
| 19h | STATUS_ALERT_MASK | R/W | Alert event mask |
| 1Ah | NEGOTIATION_INFO | R/W | Negotiation Parameters |
| 1Bh | SOURCE_PDO_FIXED_OR_VAR | R/W | Initialization parameters for fixed nd/or avariable power supply |
| 1Ch | SINK_PDO_FIXED | R/W | Initialization parameters for a sink to operate with fixed power supply |
| 1Dh | SINK_PDO_VAR | R/W | Initialization parameters for a sink to operate with variable power supply |
| 1Eh | SINK_PDO_BATTERY | R/W | Initialization parameters for a sink to operate with battery power supply |
| 21h | INITIALIZATION | R/W | Other initialization parameters for PDC configuration |
| 22h | LOW_POWER | R/W | Lower power mode configuration parameters |

In an embodiment, a STATUS_ALERT command may be issued by a host controller to retrieve an alert status from a PDC after receiving an alert signal from the PDC. For example, the STATUS_ALERT command may be indicated by a command code of 0x00 in hexadecimal format and the alert status may be about two octets long. The alert status may indicate the event that causes the PDC to send an alert signal to the host controller. Each event may be indicated by about 1-bit. For example, a bit-value of one may indicate the PDC detected an occurrence of the event and a bit-value of zero may indicate otherwise. Some of the events may comprise more detailed information, which may be retrieved by the host controller via a STATUS_USB_PD command, which may be explained more fully below. The following table lists some examples of the events that the PDC may notify the host controller:

TABLE 2

List of Alert Event Types

| Bit position | Alert status |
|---|---|
| b0 | Hard Reset |
| b1 | ErrorType |
| b2 | VendorSpecific |
| b3 | MsgType1 |
| b4 | BISTMode |
| b5 | SMBusSlave |
| b6 | PlugStatus |
| b7 | ExcessiveIRDrop |
| b8 | NegotiationUpdate |
| b9 | StoreConfigurationComplete |
| b10 | AwokenByHost controller |
| b11 | MsgType2 |

The PDC may notify the host controller of a HardReset event when a hard reset has been performed. For example, the HardReset event may be indicated by setting bit zero of the alert status to a value of one. The host controller may further retrieve the Hard Reset event value to determine the type of hard reset performed by issuing a STATUS_USB_PD command, which may be discussed more fully below.

The PDC may notify the host controller of an ErrorType event when the PDC detects an error. For example, the ErrorType event may be indicated by setting bit one of the alert status to a value of one. The host controller may further retrieve the ErrorType event value to determine the type of errors by issuing a STATUS_USB_PD command, which may be discussed more fully below.

The PDC may notify the host controller of a VendorSpecific event to report a vendor specific message related events (e.g. sent, received). For example, the VendorSpecific event may be indicated by setting bit two of the alert status to a value of one. The host controller may further retrieve the VendorSpecific event value to determine the type of vendor message events by issuing a STATUS_USB_PD command, which may be discussed more fully below.

The PDC may notify the host controller of a MsgType1 event when the PDC receives a message from the far-end port. For example, the MsgType1 event may be indicated by setting bit three of the alert status to a value of one. The host controller may further retrieve the MsgType1 event value to determine the type of message receive by issuing a STATUS_USB_PD command, which may be discussed more fully below. The host controller may take further action depending on the message type. For example, when the received message is a GotoMin message, the host controller may configure the system to draw less current from the $V_{BUS}$ (e.g. power delivery wire $V_{BUS}$ 350).

The PDC may notify the host controller of a BISTMode event when the PDC enters a BIST mode physical layer test. For example, the BISTMode event may be indicated by setting bit four of the alert status to a value of one. The PDC may notify the host controller of a SMBusSlave event when the PDC detects an error at the SMBus interface. For example, the SMBusSlave event may be indicated by setting bit five of the alert status to a value of one. The PDC may notify the host controller of a PlugStatus event when the PDC detects a change in an USB plug status (e.g. insert or removal). For example, the PlugStatus event may be indicated by setting bit six of the alert status to a value of one. The host controller may further retrieve the PlugStatus event value to determine the type of plug status changes by issuing a STATUS_USB_PD command, which may be discussed more fully below.

The PDC may notify the host controller of an ExcessiveIRDrop event when the PDC measures an excessive voltage drop on the $V_{BUS}$ wire. For example, the ExcessiveIRDrop event may be indicated by setting bit seven of the alert status to a value of one. When the host controller receives the ExcessiveIRDrop event, the host controller may configure the system to draw less current from the $V_{BUS}$ wire.

The PDC may notify the host controller of a NegotiationUpdate event when the PDC has an updated power contract after negotiating with a far-end port. For example, the NegotiationUpdate event may be indicated by setting bit eight of the alert status to a value of one. The host controller may further retrieve the NegotiationUpdate event value to determine the type of contract changes by issuing a STATUS_USB_PD command, which may be discussed more fully below.

The PDC may notify the host controller of a StoreConfigurationComplete event when the PDC has successfully stored configuration parameters to a non-volatile memory. For example, the StoreConfigurationComplete event may be indicated by setting bit nine of the alert status to a value of one. The PDC may notify the host controller of an AwokenByHost controller event to indicate that the PDC has been woken up (e.g. from a sleep mode) by the host controller either via SMBus traffic or through an assertion of a designed signal. For example, the AwokenByHost controller event may be indicated by setting bit ten of the alert status to a value of one.

In an embodiment, a CLEAR_STATUS command may be issued by a host controller to clear all the bits in the alert status. For example, the CLEAR_STATUS command may be indicated by a command code of 0x01 in hexadecimal format and the command may be about one octet long.

In an embodiment, a STATUS_USB_PD command may be issued by a host controller to retrieve a USB PD status from a PDC. For example, the STATUS_USB_PD command may be indicated by a command code of 0x02 in hexadecimal format and the USB PD status may be about four octets long. As described herein above, after the host controller is notified by the PDC of a HardReset event, the host controller may retrieve more detail information of the HardReset event by issuing the STATUS_USB_PD command. The following table lists some examples of HardReset event values:

TABLE 3

List of HardReset Event Values

| Event Value | Description |
| --- | --- |
| 000b | no hard reset |
| 001b | hard reset signaling received from far-end |
| 010b | hard reset request from device policy manager |
| 011b | hard reset done for safety |
| 100b | hard reset required by the policy engine (signaling sent to far-end) |

The PDC may indicate a HardReset event value by about 3-bits in the USB PD status. For example, an event value of zero may indicate no hard reset is performed at the PDC. An event value of one may indicate the PDC performed a hard reset caused by receiving a hard reset request from a far-end port. An event value of two may indicate the PDC performed a hard reset due to a hard reset request received from a local device policy manager. An event value of three may indicate the PDC performed a hard reset due to safety reason. An event value of four may indicate the PDC performed a hard reset due to a hard reset request received from a policy engine and the PDC has signaled the far-end port of the hard reset.

As described herein above, after the host controller is notified by the PDC of an ErrorType event, the host controller may retrieve more detail information of the ErrorType event by issuing the STATUS_USB_PD command. The following table lists some examples of ErrorType event values:

TABLE 4

List of ErrorType Event Values

| Event Value | Description |
| --- | --- |
| 0000b | No error |
| 0001b | USB PD device with incompatible specification version |
| 0010b | Host controller gave an invalid command |
| 0011b | USB PD source cannot provide an acceptable voltage and/or current. |
| 0100b | USB PD source can provide acceptable voltage and current, but not at the present time. |
| 0101-1111b | Reserved |

The PDC may indicate an ErrorType event value by about 4-bits in the USB PD status. For example, an event value of zero may indicate no error is detected at the PDC. An event value of one may indicate the PDC detects a connected USB PD device with an incompatible specification version. An event value of two may indicate receiving an invalid command from the host controller (e.g. a GotoMin command when PDC's contract does not support GotoMin). An event value of three may be indicated when the PDC is a sink and a connected USB source may not provide an acceptable voltage and/or current (e.g. a Reject message is received for a requested contract). The host controller may further retrieve the contract received by issuing an ACTIVE_CONTACT_PDO command, which may be discussed more fully below. An event value of four may be indicated when the PDC is a sink and a connected USB source may provide an acceptable voltage and/or current, but not at the present time.

As described herein above, after the host controller is notified by the PDC of a PlugStatus event, the host controller may retrieve more detail information of the PlugStatus event by issuing the STATUS_USB_PD command. The following table lists some examples of PlugStatus event values:

TABLE 5

List of PlugStatus Event Values

| Event Value | Description |
| --- | --- |
| 0000b | no cable |
| 0001b | Legacy A plug inserted |
| 0010b | Legacy B plug inserted |
| 0011b | Noplug or Legacy B plug inserted |
| 0100b | PD B Plug (Micro or Standard) inserted |
| 0101b | PD A Plug (Micro or Standard) inserted |
| 0110b | Unplugged |
| 0111b | Low-Power Micro-A Plug |
| 1000b | Legacy A plug nserted or no plug |
| 1001b | Legacy A plug inserted, device at far-end has ability to source. |
| 1010b | B plug with a non-PD device at the far-end inserted |
| 1101b | PD A Plug (Micro or Standard) inserted, device at far-end has ability to source. |
| 1110b | Reserved |
| 1111b | Low-Power Micro-A Plug, device at far-end has ability to source. |

The PDC may indicate a PlugStatus event value by about 4-bits in the USB PD status representing the different types of USB plug is inserted or removed. For example, an event value of zero may indicate no cable insertion is detected by the PDC. An event value of one may indicate the PDC detects an insertion of a legacy A plug. An event value of two may indicate the PDC detects an insertion of a legacy B plug. An event value of three may indicate the PDC detects an insertion of a legacy B plug or may not detect any plug insertion. An event value of four may indicate the PDC detects an insertion of a micro PD B plug or a standard PD B plug. An event value of five may indicate the PDC detects an insertion of a micro PD A plug or a standard PD A plug. An event value of six may indicate the PDC detects a USB plug is removed. An event value of seven may indicate the PDC detects an insertion of a low power micro PD A plug. An event value of eight may indicate the PDC detects an insertion of a legacy A plug or no plug. An event value of nine may indicate the PDC detects an insertion of a legacy A plug and a far-end port may be able to source power. An event value of ten may indicate the PDC detects an insertion of a legacy B plug and the far-end port may not support PD. An event value of thirteen may indicate the PDC detects an insertion of a micro PD B plug or a standard PD B plug and the far-end port may source power. An event value of fifteen may indicate the PDC detects an insertion of a low power micro PD A and the far-end port may source power.

When a host controller issues a USB_PD_CONTROL command to request the PDC to perform an action, the host controller may retrieve PDC control status in response to the requested action by issuing the STATUS_USB_PD command. The following table lists some examples of PDC control status values:

TABLE 6

List of PDC Control Status Values

| Status Value | Description |
| --- | --- |
| 000b | Not processing any USB PD Control command |
| 001b | Last USB PD Control command in process |
| 010b | Last USB PD Control command completed successfully |
| 011b | Last USB PD Control command failed |
| 100b | Waiting for host controller |
| 101b | Transitioning Power Supply |

The PDC may indicate a PDC control status value by about 3-bits in the USB PD status. For example, a status value of zero may indicate the PDC is not processing any USB PD control command from the host controller. A status value of one may indicate the PDC is processing a last USB PD control command issued by the host controller. A status value of two may indicate the PDC has completed the processing of a last USB PD control command issued by the host controller. A status value of three may indicate the PDC has failed to process a last USB PD control command issued by the host controller. A status value of four may indicate the PDC is waiting for the host controller to respond. For example, a PDC may be waiting on the host controller to provide a list of source capabilities for sending to a far-end device or to provide instructions to select a capability during capability evaluation. A status value of five may indicate the PDC is transitioning to another power supply.

As described herein above, after the host controller is notified by the PDC of a VendorSpecific event, the host controller may retrieve more detail information of the VendorSpecific event by issuing the STATUS_USB_PD command. The following table lists some examples of Vendor-Specific event values:

TABLE 7

List of VendorSpecific Event Values

| Event Value | Description |
| --- | --- |
| 00b | no vendor defined message activity |
| 01b | Vendor defined message send failed |
| 10b | Vendor defined message received |
| 11b | Vendor defined message sent successfully. |

The PDC may indicate a VendorSpecific event value by about 2-bits in the USB PD status. For example, an event value of zero may indicate the PDC detects no vendor specific message activity. An event value of one may indicate the PDC fails to send a vendor specific message. An event value of two may indicate the PDC receives a vendor specific message from the far-end port. An event value of three may indicate the PDC successfully sent a vendor specific message.

As described herein above, after the host controller is notified by the PDC of a MsgType1 event or a MsgType2 event indicating a message received from the far-end port, the host controller may retrieve more detailed information of the received message types by issuing the STATUS_USB_PD command. The received message may be a control message or a data message as defined in the USB PD specification. For example, a control message may be differentiated from a data message by employing 1-bit from the USB PD status, where a bit-value of one may indicate a data message and a bit-value of zero may indicate a control message. The message type may be indicated by about 4-bits and the message type values may be as defined in the USB PD specification. The host controller may further retrieve information of the received message content from the USB PD status. For example, the host controller may retrieve a peak power value embedded in a SourceCapability message or a higher capability value embedded in a SinkCapability message. In addition, a host controller may retrieve a USB communication capable value, an USB communication suspend support value, a dual role value, and/or any other fields embedded in a SourceCapability message or a SinkCapability message. The host controller may also retrieve the complete contract by issuing an ACTIVE_CONTRACT_PDO command and/or an ACTIVE_CONTRACT_RDO command, which may be discussed more fully below.

As described herein above, after the host controller is notified by the PDC of a NegotiationUpdate event, the host controller may retrieve more detailed information of the NegotiationUpdate event by issuing the STATUS_USB_PD command. The following table lists some examples of NegotiationUpdate event values:

TABLE 8

List of NegotiationUpdate Event Values

| Event Value | Description |
| --- | --- |
| 00b | No update |
| 01b | New contract and stable power state |
| 10b | The source is offering new capabilities that would increase voltage. |

The PDC may indicate a NegotiationUpdate event value by about 2-bits in the USB PD status. For example, an event value of zero may indicate the PDC may not have an updated contract to update. An event value of one may indicate the PDC has negotiated a new contract and power in a stable state. The host controller may further retrieve the updated contract by issuing an ACTIVE_CONTRACT_PDO command, which may be discussed more fully below. An event value of two may be indicated when the PDC is a sink and receives a contract from a USB source indicating that the USB source may increase voltage.

In an embodiment, a STATUS_SMBUS_SLAVE command may be issued by a host controller to a PDC to retrieve SMBus statuses. For example, the STATUS_SMBUS_SLAVE command may be indicated by a command code of 0x03 in hexadecimal format and the SMBus slave status may be about one octet long. The following table lists some examples of SMBus slave statuses:

TABLE 9

List of SMBus Status Values

| Bit position | SMBus Status |
|---|---|
| b0 | Invalid command received |
| b1 | Invalid data received |
| b2 | Invalid packet error check (PEC) received |
| b3 | Write to a read-only command |
| b4 | Incorrect block size |
| b5 | Received too much data |
| b6 | Address misuse |
| b7 | Some other unexpected error |

The PDC may indicate an invalid command is received from the host controller, for example, by setting bit zero of the SMBus status to a value of one. The PDC may indicate an invalid data is received from the host controller, for example, by setting bit one of the SMBus status to a value of one. The PDC may indicate an invalid packet error check (PEC) is received from the host controller, for example, by setting bit two of the SMBus status to a value of one. The PDC may indicate the host controller send a read-only command with a transaction type of write, for example, by setting bit three of the SMBus status to a value of one. The PDC may indicate an incorrect block size when the block size written by the host controller does not match the size of the command, for example, by setting bit four of the SMBus status to a value of one. The PDC may indicate when the number of incoming data bytes on the SMBus exceeds the expected size, for example, by setting bit five of the SMBus status to a value of one. The PDC may indicate the host controller misuse a secondary address for a command that is not a read STATUS_ALERT command when responding to an alert event, for example, by setting bit six of the SMBus status to a value of one. The PDC may indicate some other unexpected error on the SMBus, for example, by setting bit seven of the SMBus status to a value of one.

In an embodiment, an ENABLE command may be issued by a host controller to enable a PDC to begin operating with the initialization parameters. For example, the ENABLE command may be indicated by a command code of 0x05 in hexadecimal format and may be about one octet long. It should be noted that some dynamic initialization parameters may be modified subsequent to an ENABLE command.

In an embodiment, a REINITIALIZE command may be issued by a host controller to indicate the host controller may start to re-initialize PDC parameters. For example, the REINITIALIZE command may be indicated by a command code of 0x06 in hexadecimal format and may be about one octet long. It should be noted that when the PDC receives a REINITIALIZE command, the PDC may be set to a state ready for parameter re-initialization and may end a current contract.

In an embodiment, a VOLTAGE_INFO command may be issued by a host controller to retrieve PDC voltage information. For example, the VOLTAGE_INFO command may be indicated by a command code of 0x07 in hexadecimal format and may be about four octets long. The following table lists some examples of voltage information:

TABLE 10

| $V_{BUS}$ Voltage information | |
|---|---|
| Bit Position | Description |
| b0-b9 | Present voltage |
| b10-b19 | Reference voltage |
| b20-b29 | Reference voltage—present voltage |
| b31 | 1: value, 0: valid |

The voltage information may comprise a present voltage, a reference voltage, and a difference between a reference voltage and a present voltage, which may all be about 10-bits long. For example, the present voltage may indicate a current voltage measurement on the $V_{BUS}$ wire, a reference voltage may indicate a voltage measurement on the $V_{BUS}$ wire at a time when current drawing is small (e.g. small IR drop), and the difference between the reference voltage and the present voltage may indicate the IR drop on the $V_{BUS}$ wire.

In an embodiment, an ACTIVE_CONTRACT_PDO command may be issued by a host controller to retrieve a current contract negotiated by a PDC, which may carry the contract information as defined in the USB PD specification. For example, the ACTIVE_CONTRACT_PDO command may be indicated by a command code of 0x08 in hexadecimal format and may be about four octets long. It should be noted that a current contract value of all zeroes may indicate no contract is present. The contract information returned via the ACTIVE_CONTRACT_PDO command may include the maximum and the minimum voltage or a nominal voltage if the supply type is fixed. The contract information may also include a maximum current or a maximum power. Other contract information that may be present is a Dual-Role bit indicating whether a device may be a source and a sink, a USB Suspend Support bit, an externally powered bit, a USB Communications capable bit, and a Peak Power bit field.

In an embodiment, an ACTIVE_CONTRACT_RDO command may be issued by a host controller to retrieve a contract currently requested by a PDC when the PDC is a sink, which may carry the request information as defined in the USB PD specification. For example, the ACTIVE_CONTRACT_RDO command may be indicated by a command code of 0x09 in hexadecimal format and may be about four octets long. It should be noted that a request contract value of all zeroes may indicate no request contract is present. The contract information returned to the ACTIVE_CONTRACT_RDO command may include an operating current, a maximum operating current, a minimum operating current, an operating power, a maximum operating power, and/or a minimum operating power. Other information that may be included are a GiveBackFlag bit, an object position field, a capability mismatch bit, a USB Communications capable bit, and a no USB suspend bit.

In an embodiment, a USB_PD_CONTROL command may be issued by a host controller to request a PDC to perform an action. For example, the USB_PD_CONTROL command may be indicated by a command code of 0x0A in hexadecimal format and may be about one octet long. The following table lists some examples of control values:

TABLE 11

List of PDC Control Values

| Control Value | Description |
| --- | --- |
| 0000b | no action |
| 0001b | Issue a GotoMin message to a far-end |
| 0010b | Issue a Hard Reset message to a far-end |
| 0011b | Get Plug Status |
| 0101b | Disable PD |
| 0110b | Swap Required |
| 0111b | Sink OK |
| 1000b | SwitchToBrl |
| 1001b | OverridePlugStatus |
| 1010b | RequestHigherVoltage |
| 1100b | GetCap |

The PDC may indicate a PDC control by about 4-bits. For example, a control value of zero may indicate no action is requested. A control value of one may request the PDC to send a GotoMin message to a far-end port to reduce current drawing from the $V_{BUS}$ wire. A control value of two may request the PDC to send a HardReset message to a far-end port to perform a hard reset. A control value of three may request the PDC to update cable connection status, where the PDC may perform cable detection and send the host controller an alert signal when the plug status is ready. The host controller may receive the alert signal, retrieve the alert status by issuing a STATUS_ALERT command and followed by issuing a STATUS_USB_PD command to retrieve more detail information of the plug status as described herein above.

A control value of five may request the PDC to disable PD functionalities and act as a non-PD device. A control value of six may request the PDC to initiate a role swap procedure with the far-end port, for example, from a consumer to a provider or from a provider to a consumer. A control value of seven may request the PDC to connect a $V_{BUS}$ wire to an internal power rail to allow power sink over the $V_{BUS}$ wire. A control value of eight may request the PDC to disconnect the $V_{BUS}$ wire from an internal power rail and connect the internal power rail to a barrel jack. A control value of nine may request the PDC to function as a PD plug even when the inserted plug is not a PD plug, for example, the PDC may assume a 5 ampere (A) capable cable is inserted regardless of the cable detection result. A control value of ten may request the PDC to negotiate a higher voltage, for example, after receiving a NegotationUpdate event from the PDC, the host controller may request a higher voltage. A control value of twelve may request the PDC to send a capability message to the far-end port, where the capability message may be a SourceCapability message or a SinkCapability message depending on the role of the PDC.

In an embodiment, a VENDOR_SPECIFIC command may be issued by a host controller to request a PDC to send one or more vendor specific messages as defined in the USB PD specification to the far-end port. In addition, the host controller may issue the VENDOR_SPECIFIC command to retrieve a received vendor specific message. For example, the VENDOR_SPECIFIC command may be indicated by a command code of 0x0B in hexadecimal format and may be a maximum of about twenty eight octets long.

In an embodiment, a STORE_CONFIGURATION command may be issued by a host controller to request a PDC to store configuration parameters to a non-volatile memory. For example, the STORE_CONFIGURATION command may be indicated by a command code of 0x0C in hexadecimal format and may be about one octet long. When the PDC has completed storing the configuration parameters to the non-volatile memory, the PDC may send an alert signal to notify the host controller of a StoreConfigurationComplete event (e.g. if the host controller registered for the event).

In an embodiment, a RESET command may be issued by a host controller to request a PDC to perform a hard reset, which may be substantially similar to a reboot when the PDC experiences a power loss. For example, the RESET command may be indicated by a command code of 0x0D in hexadecimal format and may be about one octet long.

In an embodiment, a DEVICE_ID command may be issued by a host controller to retrieve a PDC hardware and/or a firmware version. For example, the DEVICE_ID command may be indicated by a command code of 0x0E in hexadecimal format and may be about twenty eight octets long.

In an embodiment, a SPECIFICATION_REVISION command may be issued by a host controller to retrieve a revision of the USB PD specification supported by a PDC. For example, the SPECIFICATION_REVISION command may be indicated by a command code of 0x0F in hexadecimal format and may be about one octet long. The host controller may function according to the supported specification.

In an embodiment, a SOURCE_PDO_BATTERY command may be issued by a host controller to indicate the current, the voltage, and/or the power limits when the power supply is a battery supply, which may allow a PDC to configure a battery PDO accordingly, where the PDO may be sent in a SourceCapabilities message. For example, the SOURCE_PDO_BATTERY command may be indicated by a command code of 0x10 in hexadecimal format and may be about four octets long. It should be noted that the host controller may also issue the SOURCE_PDO_BATTERY command to retrieve a previously configured battery PDO. The host controller may include the maximum and minimum voltage when the host controller is employing a battery supply as well as the power that the battery supply may provide in this command.

In an embodiment, a CAPABILITIES command may be issued by a host controller to a PDC to retrieve a SourceCapabilities or a SinkCapabilities message received from a far-end device. For example, the CAPABILITIES command may be indicated by a command code of 0x11 in hexadecimal format and may be a maximum of about twenty eight octets long. As discussed herein above, a host controller may request a PDC to send a Get_Source_Cap or a Get_Sink_Cap message to a far-end port. After the PDC message receives the requested capability message from the far-end port, the PDC may send an alert signal to the host controller to indicate a received message. The host controller may then retrieve the received capability via the CAPABILITIES command. The retrieved capability may comprise fields as defined in the USB PD specification (e.g. one or more sink PDOs or source PDOs for fixed, variable, and/or battery supply). When the PDC fails (e.g. timeout) to get a capability message from the far-end port, all fields may be zeroes.

In an embodiment, a STATUS_ALERT_MASK command may be issued by a host controller to register for alert events with a PDC or to retrieve previously configured alert events from the PDC. For example, the STATUS_ALERT_MASK command may be indicated by a command code of 0x19 in hexadecimal format and may be about two octets long. As discussed herein above, a host controller may receive an alert signal from the PDC. The host controller may register with the PDC for a set of events that the host controller is interested by issuing the STATUS_ALERT_MASK command. The alert event mask may comprise the same event types and the bit position as described in Table 2 herein above. It should be noted the configuration of the alert events may be stored in a non-volatile memory at the PDC, for example, by issuing a STORE_CONFIGURATION command as described herein above. However, the configuration of the alert events may also be changed dynamically.

In an embodiment, a NEGOTIATION_INFO command may be issued by a host controller to configure a PDC for negotiation parameters or to retrieve previously configured negotiation parameters from the PDC. For example, the NEGOTIATION_INFO command may be indicated by a command code of 0x1A in hexadecimal format and may be about four octets long. It should be noted the negotiation parameters may be stored in a non-volatile memory at the PDC, for example, by issuing a STORE_CONFIGURATION command as described herein above. However, the negotiation parameters may also be changed dynamically by applying a re-initialization method similar to method 600. The following table lists some examples of negotiation parameters:

TABLE 12

List of Negotiation Parameters

| Bit Position | Description |
| --- | --- |
| b0 | USBSuspendSupport |
| b1-b2 | ExternallyPowered |
| b3 | USBCommCapapble |
| b4 | HigherCapability |
| b5-6 | txPeakPower |
| b7-b16 | MaxCurrentSourcePdo1 |
| b17-b26 | OpCurrentSinkPdo1 |
| b29 | OfferPriority |

The USBSuspendSupport parameter may be about 1-bit long and a value of one may indicate if the device may support USB suspend operation. The ExternllyPowered parameter may be about 2-bits long and may indicate a current power supply may be provided by an external power or an unknown supply. The USBCommCapable parameter may be about 1-bit long and may indicate if the device may support USB communication. The HigherCapability parameter may be about 1-bit long and may indicate if the device may be fully functional from a default 5V supply. The txPeakPower parameter may be about 2-bits long and may indicate a peak power when the device is a source. For example, the txPeakPower may be indicated in terms of maximum current (Imax) at a percentage of operating current (Ioc) over some duration of time with a certain duty cycle (e.g. Imax of 130% Ioc at 50% duty cycle). The MaxCurrentSourcePdo1 parameter may be about 10-bits long and may indicate a maximum current the device may offer in a default 5V fixed power supply PDO when the device is a source. The OpCurrentSinkPdo1 parameter may be about 10-bits long and may indicate an operating current the device may sink in a default 5V fixed power supply PDO. The OfferPriority parameter may be about 1-bit long and may indicate if a higher current contract may be given priority over a higher voltage contract.

A host controller may configure a PDC with voltage, current, and/or power limits for various types of power supplies (e.g. fixed, variable, battery) when a device is a sink or a source. The host controller may issue a SOURCE_PDO_FIXED_PDO_VAR command to configure a PDC for fixed source and/or variable source PDOs and may be indicated. For example, the SOURCE_PDO_FIXED_PDO_VAR command may be indicated by a command code of 0x1B in hexadecimal format and may be a maximum of twenty four octets long (e.g. up to six PDOs). A fixed supply source PDO may comprise a dual-role field, an externally powered field, a USB communication capable field, a peak current field, and a nominal voltage file as defined in the USB PD specification. A variable supply source PDO may comprise a maximum voltage field, a minimum voltage field, and a maximum current field as defined in the USB PD specification. The host controller may issue a SINK_PDO_FIXED command to configure a PDC for a fixed sink PDO. The fixed supply sink PDO may comprise a dual-role field, a higher capability field, an externally powered field, a USB communication capable field, a nominal voltage field, and an operational current field as defined in the USB PD specification. For example, the SINK_PDO_FIXED command may be indicated by a command code of 0x1C in hexadecimal format and may be about four octets long. The host controller may issue a SINK_PDO_VAR command to configure a PDC for a variable sink PDO. A variable supply sink PDO may comprise a maximum voltage field, a minimum voltage field, and an operational current field as defined in the USB PD specification. For example, the SINK_PDO_VAR command may be indicated by a command code of 0x1D in hexadecimal format and may be about four octets long. The host controller may issue a SINK_PDO_BATTERY command to configure a PDC for a battery sink PDO. A battery supply source PDO may comprise a maximum voltage field, a minimum voltage field, and an operational current field as defined in the USB PD specification. For example, the SINK_PDO_BATTERY command may be indicated by a command code of 0x1E in hexadecimal format and may be about four octets long. In addition, the host controller may retrieve any of the PDOs by issuing a same command with a read transaction type. It should be noted that the various types of PDOs may be configured or retrieved via other command variations and may not be limited to the above description. In addition, the PDOs may be stored in a non-volatile memory at the PDC, for example, by issuing a STORE_CONFIGURATION command as described herein above.

In an embodiment, an INITIALIZATION command may be issued by a host controller to configure a PDC for initialization parameters or to retrieve previously configured initialization parameters from the PDC. For example, the INITIALIZATION command may be indicated by a command code of 0x21 in hexadecimal format and may be about four octets long. It should be noted the initialization parameters may be stored in a non-volatile memory at the PDC, for example, by issuing a STORE_CONFIGURATION command as described herein above.

The following table lists some examples of the initialization parameters:

TABLE 13

List of Initialization Parameters

| Bit Position | Description |
|---|---|
| b0-b2 | ReceptacleType |
| b3-b4 | CurrentRating |
| b5 | ProcessSwapToSource |
| b6 | ProcessSwapToSink |
| b7 | InitiateSwapToSource |
| b8 | InitiateSwapToSink |
| b9-b11 | AcceptBistRequests |
| b12 | AcceptVoltageFromNonPD |
| b13-b14 | SMBusTimeout |
| b15-b16 | DeviceRole |
| b17-b19 | Source_PDO_Count |
| b20 | Battery_PDO_Count |

The ReceptacleType parameter may be about 2-bits long and may indicate the receptacle or cable types supported by the device. The following table lists some examples of receptacle types:

TABLE 14

List of Receptacle Types

| Type Value | Description |
|---|---|
| 000b | Captive cable |
| 001b | Standard A (with an insert pin) |
| 010b | Standard A (without an insert pin) |
| 011b | Micro AB |
| 100b | Standard B |
| 101b | Micro B |

The ReceptacalType parameter may be indicated by about 3-bits. A type value of zero may indicate a device with a captive cable. A type value of one may indicate a standard A cable with an insert pin that indicates the presence of a plug. A type value of two may indicate a standard A cable without an insert pin. A type value of three may indicate a micro AB cable. A type value of four may indicate a standard B cable. A type value of five may indicate a micro B cable.

The CurrentRating parameter may be indicated by about 2-bits and may indicate the amount of current (e.g. 2 A, 3 A, 4 A, or 5 A) that may be negotiated on the receptacle. The ProcessSwapToSource parameter may be indicated by about 1-bit, where a value of one may indicate the PDC may automatically process a far-end request to swap to a source and a value of zero may indicate the PDC to defer the decision to the host controller. The ProcessSwapToSink parameter may be indicated by about 1-bit, where a value of one may indicate the PDC may automatically process a far-end request to swap to a sink and a value of zero may indicate the PDC to defer the decision to the host controller. The InitiateSwapToSource parameter may be indicated by about 1-bit, where a value of one may indicate the PDC may automatically initiate a swap to a source when possible and a value of zero may indicate the PDC may wait for the host controller to initiate. The InitiateSwapToSink parameter may be indicated by about 1-bit, where a value of one may indicate the PDC may automatically initiate a swap to a sink when possible and a value of zero may indicate the PDC may wait for the host controller to initiate. The AcceptBISTorCarrierReq parameter may be indicated by about 1-bit, where a value of one may indicate the PDC may automatically enter a BIST eye patter or BIST carrier mode and a value of zero may indicate the PDC may reject the request. The AcceptBISTtransmit parameter may be indicated by about 1-bit, where a value of one may indicate the PDC may automatically enter a BIST transmit mode and a value of zero may indicate the PDC may reject the request. The AcceptBISTreceive parameter may be indicated by about 1-bit, where a value of one may indicate the PDC may automatically enter a BIST receive mode and a value of zero may indicate the PDC may reject the request. The AcceptVoltageFromNonPD parameter may be indicated by about 1-bit, where a value of one may indicate the PDC may connect the $V_{BUS}$ to an internal rail when a voltage is supplied by a non-PD far-end device and a value of zero may indicate otherwise. The SMBusTimeout parameter may be indicated by about 2-bits and may indicate the amount of time (e.g. 0, 11, 100, or 1000 millisecond (ms), the PDC may wait after a last SMBus activity before entering sleep mode. The DeviceRole parameter may be indicated by about 2-bits and may indicate if the device is a consumer, a producer, a C/P, or a C/P. The Source_Pdo_count may be indicated by about 3-bits and may indicate the number of PDOs to send in a SourceCapabilityMessage. It should be noted that there may be at least one PDO. The Battery_Pdo_count may be indicated by about 1-bit, where a value of one may indicate the PDC may send a battery PDO and a value of zero may indicate otherwise.

In an embodiment, a LOW_POWER command may be issued by a host controller to configure a PDC for low power mode parameters or retrieve previously configured low power mode parameters from the PDC. For example, the LOW_POWER command may be indicated by a command code of 0x22 in hexadecimal format and may be about two octets long. It should be noted the low power mode parameters may be stored in a non-volatile memory at the PDC, for example, by issuing a STORE_CONFIGURATION command as described herein above. However, the lower power mode parameters may also be changed dynamically by applying a re-initialization method similar to method 600. The following table lists some examples of low power mode parameters, which may all be about 1-bit long:

TABLE 15

List of Low Power Mode Parameters

| Bit Position | Description |
|---|---|
| b0 | UseSleepMode |
| b1 | GoToDisabledState |
| b2 | RunSinkCapabilityTimer |
| b3 | WakeForSMBusStatus |
| b4 | WakeOnlyForPD |
| b5 | DrawFromVbus |
| b6 | ImplementDeadBattery |
| b7 | UseLongSleepTimer |
| b8 | StopSourcing |

The UseSleepMode parameter may indicate if the PDC may enter sleep mode when possible. The GoToDisabledState may indicate if the PDC may enter a disabled state as defined in the USB PD specification. The RunSinkCapabilityTimer may indicate if the PDC may run a SinkCapabilityTimer during discovery in a sink role, where the SinkCapabiltiyTimer may be as defined in the USB PD specification. The WakeForSMBusStatus may indicate if the PDC may wake from sleep mode when SMBus traffic is present. The WakeOnlyForPD parameter may indicate if the PDC may wake from sleep mode when a PD cable is inserted, but not when a legacy cable is inserted. The DrawFromVbus parameter may indicate if the PDC may draw power from the $V_{BUS}$ wire when possible or only draw power from the $V_{BUS}$ wire when the $V_{BUS}$ wire is the only source. The ImplementDeadBattery parameter may indicate if the PDC may react to a dead battery probing by a far-end device. The UseLongSleepTimer parameter may indicate if the PDC may use enter a long sleep mode in between polling for cable-type or dead-battery detection. The StopSourcing parameter may indicate if the PDC may stop sourcing voltage on the $V_{BUS}$ wire. For example, the PDC may cancel a present contract when the PDC is a source and may not negotiate for a new contract as a source. When no contract is in place and the device is a P/C, the device may appear as if it has a dead-battery to a C/P connected at the far-end port.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A power delivery system comprising:
   a power delivery controller (PDC) having a bus input_configured to receive a reset command from a host device, and an output port configured to send a hard reset signal to a powered device (PD) external to the power delivery system based on the reset command;
   wherein the PDC is coupled to the host device via a system management bus including a SMBus; and
   wherein when a reset command is received, the hard reset signal causes a bus voltage to be between approximately 0 volts and 0.5 volts for a first period then returning to between approximately 4.75 volts and 5.25 volts.

2. The power delivery system of claim 1, further comprising a host controller.

3. The power delivery system of claim 2, wherein the host controller is integrated with the PDC to form a single device.

4. The power delivery system of claim 1, wherein the reset command to the PDC includes a one-bit hard reset field.

5. The power delivery system of claim 1, wherein the PDC is configured to notify the host controller after sending the hard reset signal.

6. The power delivery system of claim 1, wherein the PDC is configured to establish a Universal Serial Bus connection with the powered device.

7. The power delivery system of claim 5, wherein the PDC is configured to generate the hard reset signal based on the reset command.

8. A Universal Serial Bus (USB) power delivery system comprising:
   a USB power delivery controller (PDC) having a bus input configured to receive a reset command from a host device, and an output port configured to send a hard reset signal to a powered device (PD) external to the power delivery system based on the reset command;
   wherein the PDC is coupled to the host device via a system management bus including a SMBus; and
   wherein when a reset command is received, the hard reset signal causes a bus voltage to be between approximately 0 volts and 0.5 volts for a first period then returning to between approximately 4.75 volts and 5.25 volts.

9. The USB power delivery system of claim 8, wherein the reset command to the USB PDC includes a one-bit hard reset field.

10. The USB power delivery system of claim 9, wherein the USB PDC is configured to notify the host controller after sending the hard reset signal.

11. The USB power delivery system of claim 8, wherein the USB PDC is configured to establish a Universal Serial Bus connection with the powered device.

12. The power delivery system of claim 8, wherein the USB PDC is configured to generate the hard reset signal based on the reset command.

13. An integrated circuit comprising:
    a USB power device controller (PDC) having a bus input configured to receive a reset command from a host device, a processor configured to generate a hard reset signal based on the reset command, and an output port configured to transmit the hard reset signal to a USB powered device (PD) external to a power delivery system including the integrated circuit;
    wherein the PDC is coupled to the host device via a system management bus including a SMBus; and
    wherein when a reset command is received, the hard reset signal causes a bus voltage to be between approximately 0 volts and 0.5 volts for a first period then returning to between approximately 4.75 volts and 5.25 volts.

14. The integrated circuit of claim 13, wherein the USB PDC is configured to send the hard reset signal to the USB PD.

15. The integrated circuit of claim 13, wherein USB PDC is configured to notify the host controller after sending the hard reset signal.

* * * * *